(12) United States Patent
Pabst et al.

(10) Patent No.: US 8,492,919 B2
(45) Date of Patent: Jul. 23, 2013

(54) WIND POWER GENERATOR EQUIPPED WITH A COOLING SYSTEM

(75) Inventors: Otto Pabst, Rio di Pusteria (IT); Georg Folie, Prato Allo Stelvio (IT); Matteo Casazza, Vipiteno (IT); Paolo Bustreo, Vipiteno (IT); Peter Gebhard, Velturno (IT)

(73) Assignee: Wilic S.AR.L., Luxembourg (LU)

( * ) Notice: Subject to any disclaimer, the term of this patent is extended or adjusted under 35 U.S.C. 154(b) by 605 days.

(21) Appl. No.: 12/485,645

(22) Filed: Jun. 16, 2009

(65) Prior Publication Data

US 2010/0176600 A1 Jul. 15, 2010

(30) Foreign Application Priority Data

Jun. 19, 2008 (IT) .............................. MI2008A1122

(51) Int. Cl.
*F03D 9/00* (2006.01)
*H02P 9/04* (2006.01)

(52) U.S. Cl.
USPC ............................................. 290/44; 290/55

(58) Field of Classification Search
USPC .................. 290/44, 55; 415/4.2, 4.1, 2.1, 4.5, 415/905, 176, 178, 208.1; 60/398
See application file for complete search history.

(56) References Cited

U.S. PATENT DOCUMENTS

| | | | |
|---|---|---|---|
| 1,362,753 A * | 12/1920 | Sperry | 290/44 |
| 1,894,357 A | 1/1933 | Manikowske et al. | |
| 1,948,854 A | 2/1934 | Heath | |
| 1,979,813 A | 11/1934 | Reis | |
| 2,006,172 A | 6/1935 | Klappauf | |
| 2,040,218 A | 5/1936 | Soderberg | |
| 2,177,801 A | 10/1939 | Erren | |
| 2,469,734 A | 5/1949 | Ledwith | |
| 2,496,897 A | 2/1950 | Strickland | |
| 2,655,611 A | 10/1953 | Sherman | |
| 2,739,253 A | 3/1956 | Plumb | |
| 2,806,160 A | 9/1957 | Brainard | |
| 2,842,214 A | 7/1958 | Prewitt | |
| 2,903,610 A | 9/1959 | Bessiere | |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Julio Gonzalez Ramirez
(74) *Attorney, Agent, or Firm* — Neal, Gerber & Eisenberg LLP

(57) ABSTRACT

A wind power generator has a nacelle; a hub rotatable about an axis of rotation with respect to the nacelle; at least two blades fitted to the hub; an electric machine which is fitted to the nacelle, is bounded by an inner surface extending about the axis of rotation, and has a rotor and a stator; and a cooling system for airflow cooling the electric machine, and which has a deflector body for defining a gap between the deflector body and the electric machine and guiding the airflow into the gap.

16 Claims, 4 Drawing Sheets

U.S. PATENT DOCUMENTS

| | | |
|---|---|---|
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,246,126 B1 * | 6/2001 | Van Der Veken et al. ...... 290/55 |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Elrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,492,743 B1 | 12/2002 | Appa |
| 6,492,754 B1 | 12/2002 | Weiglhofer et al. |
| 6,504,260 B1 | 1/2003 | Debleser |
| 6,515,390 B1 | 2/2003 | Lopatinsky et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |

| | | | | | | |
|---|---|---|---|---|---|---|
| 6,903,475 B2 | 6/2005 | Ortt et al. | | 2006/0006658 A1 | 1/2006 | McCoin |
| 6,906,444 B2 | 6/2005 | Hattori et al. | | 2006/0012182 A1 | 1/2006 | McCoin |
| 6,911,741 B2 | 6/2005 | Petteersen et al. | | 2006/0028025 A1 | 2/2006 | Kikuchi et al. |
| 6,921,243 B2 | 7/2005 | Canini et al. | | 2006/0066110 A1* | 3/2006 | Jansen et al. .................... 290/44 |
| 6,931,834 B2 | 8/2005 | Jones | | 2006/0071575 A1 | 4/2006 | Jansen et al. |
| 6,933,645 B1 | 8/2005 | Watson | | 2006/0091735 A1 | 5/2006 | Song et al. |
| 6,933,646 B2 | 8/2005 | Kinoshita | | 2006/0125243 A1 | 6/2006 | Miller |
| 6,942,454 B2 | 9/2005 | Ohlmann | | 2006/0131985 A1 | 6/2006 | Qu et al. |
| 6,945,747 B1 | 9/2005 | Miller | | 2006/0152012 A1 | 7/2006 | Wiegel et al. |
| 6,949,860 B2 | 9/2005 | Hama et al. | | 2006/0152015 A1 | 7/2006 | Bywaters et al. |
| 6,951,443 B1 | 10/2005 | Blakemore | | 2006/0152016 A1 | 7/2006 | Bywaters et al. |
| 6,972,498 B2 | 12/2005 | Jamieson et al. | | 2007/0024132 A1* | 2/2007 | Salamah et al. ................ 310/64 |
| 6,983,529 B2 | 1/2006 | Ortt et al. | | 2007/0187954 A1 | 8/2007 | Struve et al. |
| 6,984,908 B2 | 1/2006 | Rinholm et al. | | 2007/0187956 A1 | 8/2007 | Wobben |
| 6,987,342 B2 | 1/2006 | Hans | | 2007/0222226 A1 | 9/2007 | Casazza et al. |
| 6,998,729 B1 | 2/2006 | Wobben | | 2007/0222227 A1 | 9/2007 | Casazza et al. |
| 7,004,724 B2 | 2/2006 | Pierce et al. | | 2008/0061559 A1* | 3/2008 | Hirshberg ....................... 290/55 |
| 7,008,172 B2 | 3/2006 | Selsam | | 2008/0107526 A1 | 5/2008 | Wobben |
| 7,008,348 B2 | 3/2006 | LaBath | | 2008/0118342 A1 | 5/2008 | Seidel et al. |
| 7,016,006 B2 | 3/2006 | Song | | 2008/0290664 A1 | 11/2008 | Kruger |
| 7,021,905 B2 | 4/2006 | Torrey et al. | | 2008/0303281 A1 | 12/2008 | Krueger |
| 7,028,386 B2 | 4/2006 | Kato et al. | | 2008/0315594 A1 | 12/2008 | Casazza et al. |
| 7,038,343 B2 | 5/2006 | Agnes et al. | | 2009/0302702 A1 | 12/2009 | Pabst et al. |
| 7,042,109 B2 | 5/2006 | Gabrys | | 2010/0019502 A1 | 1/2010 | Pabst et al. |
| 7,075,192 B2 | 7/2006 | Bywaters et al. | | 2010/0026010 A1 | 2/2010 | Pabst |
| 7,081,696 B2 | 7/2006 | Ritchey | | 2010/0117362 A1 | 5/2010 | Vihriala et al. |
| 7,088,024 B2 | 8/2006 | Agnes et al. | | 2010/0123318 A1 | 5/2010 | Casazza et al. |
| 7,091,642 B2 | 8/2006 | Agnes et al. | | FOREIGN PATENT DOCUMENTS | | |
| 7,095,128 B2 | 8/2006 | Canini et al. | | | | |
| 7,098,552 B2 | 8/2006 | McCoin | | CN | 1554867 | 12/2004 |
| 7,109,600 B1 | 9/2006 | Bywaters et al. | | DE | 1130913 | 6/1962 |
| 7,116,006 B2 | 10/2006 | McCoin | | DE | 2164135 | 7/1973 |
| 7,119,469 B2 | 10/2006 | Ortt et al. | | DE | 2322458 | 11/1974 |
| 7,154,191 B2* | 12/2006 | Jansen et al. .................... 290/55 | | DE | 2506160 | 8/1976 |
| 7,161,260 B2 | 1/2007 | Krüger-Gotzmann et al. | | DE | 2922885 | 12/1980 |
| 7,166,942 B2 | 1/2007 | Yokota | | DE | 3638129 | 5/1988 |
| 7,168,248 B2 | 1/2007 | Sakamoto et al. | | DE | 3718954 | 12/1988 |
| 7,179,056 B2 | 2/2007 | Sieffriedsen | | DE | 3844505 | 7/1990 |
| 7,180,204 B2 | 2/2007 | Grant et al. | | DE | 3903399 | 8/1990 |
| 7,183,665 B2 | 2/2007 | Bywaters et al. | | DE | 4304577 | 8/1994 |
| 7,196,446 B2 | 3/2007 | Hans | | DE | 4402184 | 8/1995 |
| 7,259,472 B2 | 8/2007 | Miyake et al. | | DE | 4415570 | 11/1995 |
| 7,281,501 B2 | 10/2007 | Leufen et al. | | DE | 4444757 | 6/1996 |
| 7,285,890 B2 | 10/2007 | Jones et al. | | DE | 29706980 | 7/1997 |
| 7,323,792 B2 | 1/2008 | Sohn | | DE | 19636591 | 3/1998 |
| 7,358,637 B2 | 4/2008 | Tapper | | DE | 19644355 | 4/1998 |
| 7,377,163 B2 | 5/2008 | Miyagawa | | DE | 19652673 | 6/1998 |
| 7,392,988 B2 | 7/2008 | Moldt et al. | | DE | 19711869 | 9/1998 |
| 7,427,814 B2* | 9/2008 | Bagepalli et al. ................ 290/55 | | DE | 19748716 | 11/1998 |
| 7,431,567 B1 | 10/2008 | Bevington et al. | | DE | 29819391 | 2/1999 |
| 7,458,261 B2 | 12/2008 | Miyagawa | | DE | 19801803 | 4/1999 |
| 7,482,720 B2 | 1/2009 | Gordon et al. | | DE | 19947915 | 4/2001 |
| 7,548,008 B2 | 6/2009 | Jansen et al. | | DE | 19951594 | 5/2001 |
| 7,687,932 B2 | 3/2010 | Casazza et al. | | DE | 20102029 | 8/2001 |
| 8,053,918 B2* | 11/2011 | Wobben ........................ 290/55 | | DE | 10219190 | 11/2003 |
| 2002/0047418 A1 | 4/2002 | Seguchi et al. | | DE | 10246690 | 4/2004 |
| 2002/0047425 A1 | 4/2002 | Coupart et al. | | DE | EP 1586769 A2 * | 10/2005 |
| 2002/0056822 A1 | 5/2002 | Watanabe et al. | | DE | 102004018524 | 11/2005 |
| 2002/0063485 A1 | 5/2002 | Lee et al. | | DE | 102004028746 | 12/2005 |
| 2002/0089251 A1 | 7/2002 | Tajima et al. | | EP | 0013157 | 7/1980 |
| 2002/0148453 A1 | 10/2002 | Watanabe et al. | | EP | 0232963 | 8/1987 |
| 2003/0011266 A1 | 1/2003 | Morita et al. | | EP | 0313392 | 4/1989 |
| 2003/0102677 A1 | 6/2003 | Becker et al. | | EP | 0627805 | 12/1994 |
| 2003/0137149 A1 | 7/2003 | Northrup et al. | | EP | 1108888 | 6/2001 |
| 2003/0230899 A1 | 12/2003 | Martinez | | EP | 1167754 | 1/2002 |
| 2004/0086373 A1 | 5/2004 | Page, Jr. | | EP | 1289097 | 3/2003 |
| 2004/0094965 A1 | 5/2004 | Kirkegaard et al. | | EP | 1291521 | 3/2003 |
| 2004/0119292 A1 | 6/2004 | Datta et al. | | EP | 1309067 | 5/2003 |
| 2004/0150283 A1 | 8/2004 | Calfo et al. | | EP | 1363019 | 11/2003 |
| 2004/0151575 A1 | 8/2004 | Pierce et al. | | EP | 1375913 | 1/2004 |
| 2004/0151577 A1 | 8/2004 | Pierce et al. | | EP | 1394406 | 3/2004 |
| 2004/0179934 A1* | 9/2004 | Wobben ........................ 415/4.1 | | EP | 1394451 | 3/2004 |
| 2004/0189136 A1 | 9/2004 | Kolomeitsev et al. | | EP | 1589222 | 10/2005 |
| 2005/0002783 A1 | 1/2005 | Hiel et al. | | EP | 1612415 | 1/2006 |
| 2005/0082839 A1 | 4/2005 | McCoin | | EP | 1641102 | 3/2006 |
| 2005/0230979 A1 | 10/2005 | Bywaters et al. | | EP | 1677002 | 7/2006 |
| 2005/0280264 A1 | 12/2005 | Nagy | | EP | 1772624 | 4/2007 |
| 2006/0000269 A1 | 1/2006 | LeMieux et al. | | EP | 1780409 | 5/2007 |
| 2006/0001269 A1 | 1/2006 | Jansen et al. | | EP | 1829762 | 9/2007 |

| | | | | | | |
|---|---|---|---|---|---|---|
| EP | 1921311 | 5/2008 | | RU | 2000466 | 9/1993 |
| ES | 2140301 | 2/2000 | | RU | 2229621 | 5/2004 |
| FR | 806292 | 12/1936 | | WO | WO8402382 | 6/1984 |
| FR | 859844 | 12/1940 | | WO | WO9105953 | 5/1991 |
| FR | 1348765 | 1/1964 | | WO | WO9212343 | 7/1992 |
| FR | 2401091 | 3/1979 | | WO | WO9730504 | 8/1997 |
| FR | 2445053 | 7/1980 | | WO | WO9733357 | 9/1997 |
| FR | 2519483 | 7/1983 | | WO | WO9840627 | 9/1998 |
| FR | 2594272 | 8/1987 | | WO | WO9930031 | 6/1999 |
| FR | 2760492 | 9/1998 | | WO | WO9933165 | 7/1999 |
| FR | 2796671 | 1/2001 | | WO | WO9937912 | 7/1999 |
| FR | 2798168 | 3/2001 | | WO | WO9939426 | 8/1999 |
| FR | 2810374 | 12/2001 | | WO | WO0001056 | 1/2000 |
| FR | 2882404 | 8/2006 | | WO | WO0106121 | 1/2001 |
| GB | 859176 | 1/1961 | | WO | WO0106623 | 1/2001 |
| GB | 1524477 | 9/1978 | | WO | WO0107784 | 2/2001 |
| GB | 1537729 | 1/1979 | | WO | WO0121956 | 3/2001 |
| GB | 2041111 | 9/1980 | | WO | WO0125631 | 4/2001 |
| GB | 2050525 | 1/1981 | | WO | WO0129413 | 4/2001 |
| GB | 2075274 | 11/1981 | | WO | WO0134973 | 5/2001 |
| GB | 2131630 | 6/1984 | | WO | WO0135517 | 5/2001 |
| GB | 2144587 | 3/1985 | | WO | WO0169754 | 9/2001 |
| GB | 2208243 | 3/1989 | | WO | WO0233254 | 4/2002 |
| GB | 2266937 | 11/1993 | | WO | WO02057624 | 7/2002 |
| GB | 2372783 | 9/2002 | | WO | WO02083523 | 10/2002 |
| JP | 57059462 | 4/1982 | | WO | WO03067081 | 8/2003 |
| JP | 3145945 | 6/1991 | | WO | WO03076801 | 9/2003 |
| JP | 5122912 | 5/1993 | | WO | WO2004017497 | 2/2004 |
| JP | 6002970 | 1/1994 | | WO | WO2005103489 | 11/2005 |
| JP | 6269141 | 9/1994 | | WO | WO2006013722 | 2/2006 |
| JP | 10-070858 | 3/1998 | | WO | WO2007063370 | 6/2007 |
| JP | 11236977 | 8/1999 | | WO | WO2008086608 | 7/2008 |
| JP | 11-299197 | 10/1999 | | WO | WO2008116463 | 10/2008 |
| JP | 2000-134885 | 5/2000 | | WO | WO 2009/044843 A1 * | 4/2009 |
| JP | 2001-057750 | 2/2001 | | | | |
| JP | 2004-153913 | 5/2004 | | | | |
| JP | 2004-297947 | 10/2004 | | | | |
| JP | 2005-006375 | 1/2005 | | | | |
| JP | 2005-020906 | 1/2005 | | | | |
| JP | 2005-312150 | 11/2005 | | | | |
| NL | 8902534 | 5/1991 | | | | |

OTHER PUBLICATIONS

Variable Speed Gearless Wind Turbine (website), http://www.mhi.cojp/msmw/mw/en/gearless.html, viewed on Sep. 22, 2006.

* cited by examiner

US 8,492,919 B2

WIND POWER GENERATOR EQUIPPED WITH A COOLING SYSTEM

PRIORITY CLAIM

This application claims the benefit of and priority to Italian Patent Application No. MI2008A 001122, filed on Jun. 19, 2008, the entire contents of which are incorporated herein.

BACKGROUND

Known airflow cooling systems are not particularly efficient, especially in the case of generators equipped with a cylindrical electric machine.

SUMMARY

The present invention relates to a wind power generator equipped with a cooling system.

More specifically, the present invention relates to a wind power generator comprising a nacelle; a hub rotatable about an axis of rotation with respect to the nacelle; at least two blades fitted to the hub; an electric machine which is fitted to the nacelle, is bounded by an inner surface extending about the axis of rotation, and has a rotor and a stator; and a cooling system for airflow cooling the electric machine.

It is an object of the present invention to provide a wind power generator equipped with a highly efficient cooling system.

A further object of the present invention is to provide a wind power generator equipped with a straightforward, low-cost cooling system.

According to one embodiment of the present invention, there is provided a wind power generator equipped with a cooling system, the wind power generator comprising a nacelle; a hub rotatable about an axis of rotation with respect to the nacelle; at least two blades fitted to the hub; an electric machine which is fitted to the nacelle, is bounded by an inner surface extending about the axis of rotation, and has a rotor and a stator; and a cooling system for airflow cooling the electric machine, and which comprises a deflector body for defining a gap between the deflector body and the electric machine and guiding the airflow into the gap.

According to the present invention, the efficiency of the cooling system is improved by the entire airflow being forced into the gap, which runs close to the electric machine and improves thermal exchange by preventing part of the airflow from flowing too far away from the hottest parts of the electric machine.

Additional features and advantages are described in, and will be apparent from, the following Detailed Description and the figures.

BRIEF DESCRIPTION OF THE DRAWINGS

A non-limiting embodiment of the present invention will be described by way of example with reference to the accompanying drawings, in which.

DETAILED DESCRIPTION

Figure 1:
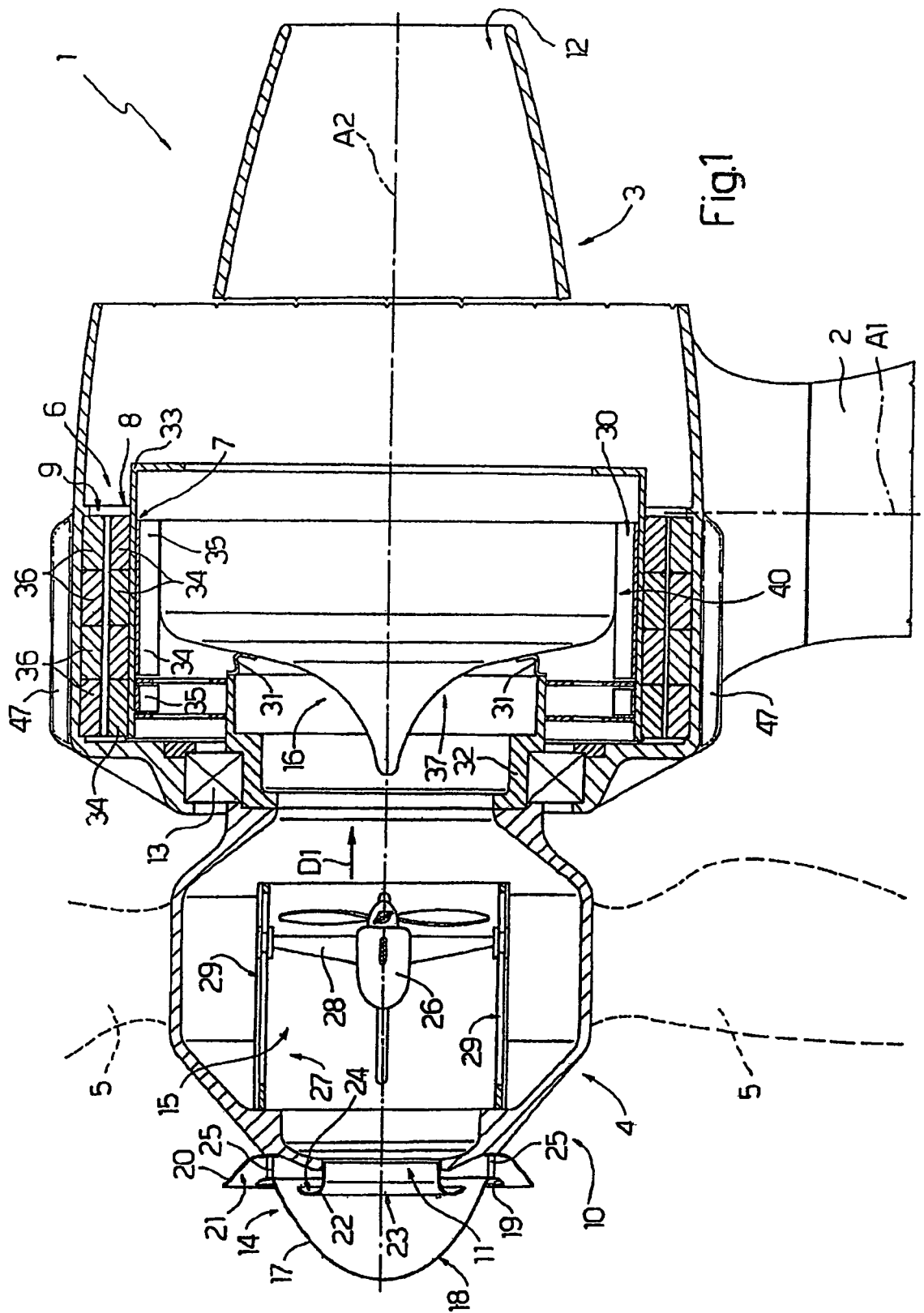
FIG. 1 shows a partly sectioned side view, with parts removed for clarity, of a wind power generator in accordance with the present invention.

Number 1 in FIG. 1 indicates as a whole a wind power generator, which comprises a pylon 2 extending along a vertical axis A1; a nacelle 3 fitted to the top end of pylon 2 and rotatable with respect to pylon 2 about axis A1; a hub 4 mounted to rotate with respect to nacelle 3 about an axis of rotation A2 crosswise to axis A1; and three blades 5, only two of which are shown by dash lines in FIG. 1.

Pylon 2 is substantially defined by a hollow cylinder housing stairs (not shown in the drawings) and/or lifts (not shown in the drawings).

Pylon 2 is normally secured to the ground by a foundation (not shown in the drawings). Alternatively, in off-shore systems, pylon 2 is secured to a floating platform (not shown in the drawings).

Nacelle 3 comprises a hollow body fitted to the top end of pylon 2 to rotate about axis A1, and supports an electric machine 6 having a rotor 8 and a stator 9, and bounded by an inner surface 7 extending about axis of rotation A2. In other words, electric machine 6 is a hollow cylindrical generator.

Likewise, hub 4 comprises a hollow body integral with rotor 8.

Wind power generator 1 comprises a cooling system 10 supported partly by hub 4 and partly by nacelle 3, and which serves to airflow cool electric machine 6, and in particular to conduct an airflow, predominantly in a direction D1 parallel to axis of rotation A2, from an inlet 11 in hub 4 to an outlet 12 in nacelle 3.

In the example shown in the drawings, stator 9 extends about rotor 8, and rotor 8 is integral with hub 4 and extends inside stator 9. The inner surface 7 of electric machine 6 is therefore the inner surface of rotor 8.

Stator 9 is fixed or connected directly to nacelle 3 along an inner cylindrical surface of nacelle 3. Hub 4 and rotor 8 are connected to each other and supported by a bearing 13 in turn supported by nacelle 3.

In a variation not shown in the drawings, the rotor extends about the stator, the stator is located inside the rotor, and the inner surface of the electric machine is defined by the stator.

Cooling system 10 comprises, in succession from inlet 11 to outlet 12, an air intake filtration device 14; a ventilation unit 15; and a deflector body 16.

Figure 4:
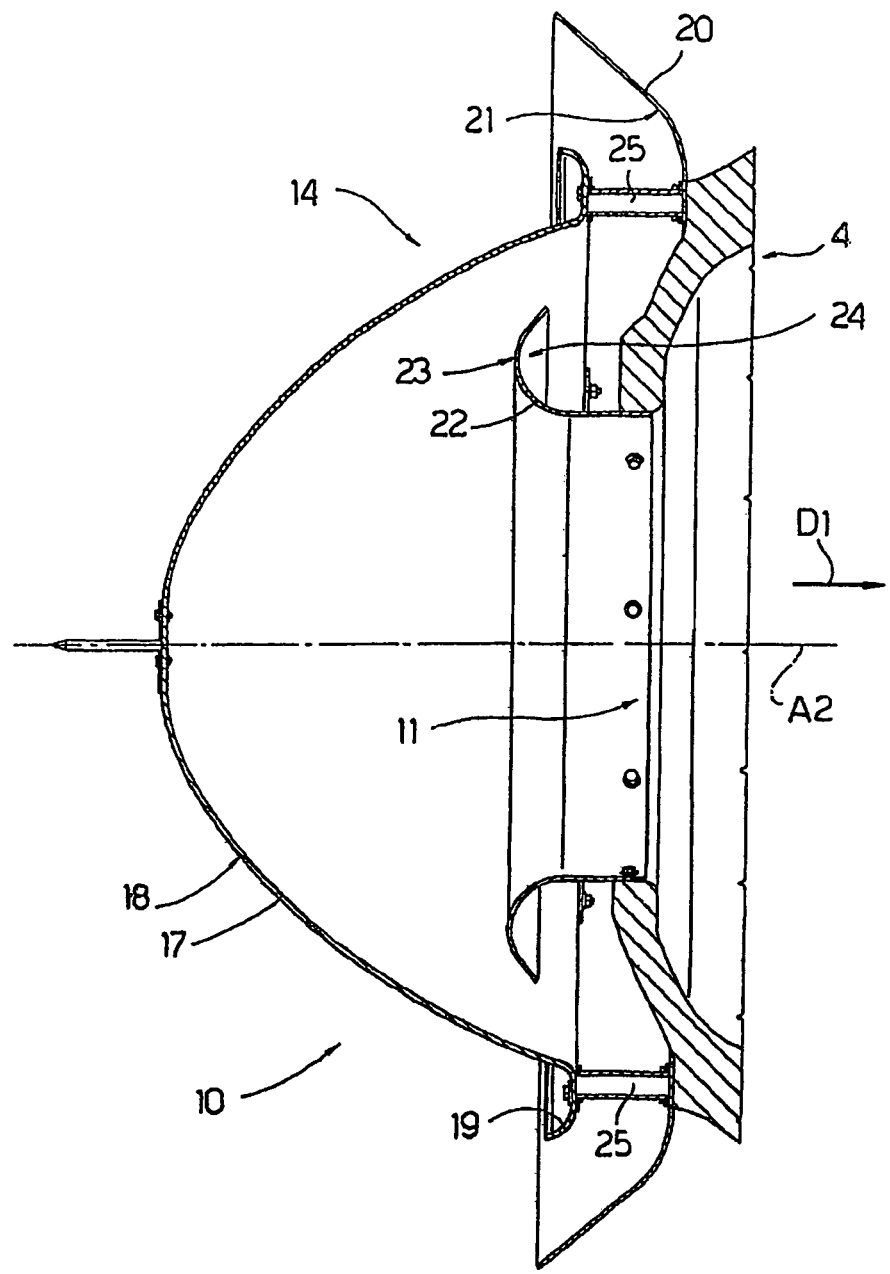
FIG. 4 shows a larger-scale lateral section of a detail of the FIG. 1 wind power generator.

With reference to FIG. 4, filtration device 14 is fitted to hub 4, is located at inlet 11, and comprises a convex panel 17 located in front of inlet 11 and having an outward-facing convex face 18 and an oppositely-convex annular edge 19; an annular panel 20 having a concave face 21 extending about edge 19 and facing convex panel 17; and an annular panel 22 extending inside convex panel 17 and comprising a convex face 23 facing convex panel 17, and a concave face 24 facing hub 4.

Panel 17 is fitted to hub 4 by spacer arms 25, whereas panels 20 and 22 are fixed or connected directly to hub 4 about inlet 11. Panels 17, 20 and 22 are guide panels for guiding the air intake into hub 4, and are designed and positioned with respect to one another to define a labyrinth air intake path. Filtration device 14 thus prevents, or at least reduces, entry of water, snow or impurities into hub 4 and nacelle 3.

With reference to FIG. 1, ventilation unit 15 is housed inside hub 4, and comprises a powered fan 26; a guide 27 parallel to axis of rotation A2; and a slide 28 that runs along guide 27 in direction D1, and supports fan 26.

Guide 27 comprises two rails 29 located about axis of rotation A2 and extending in direction D1. Fan 26 serves to increase airflow speed in direction D1 into nacelle 3.

Deflector body 16 serves to form a gap 30 between deflector body 16 itself and electric machine 6, and to guide the airflow into gap 30.

Figure 2:
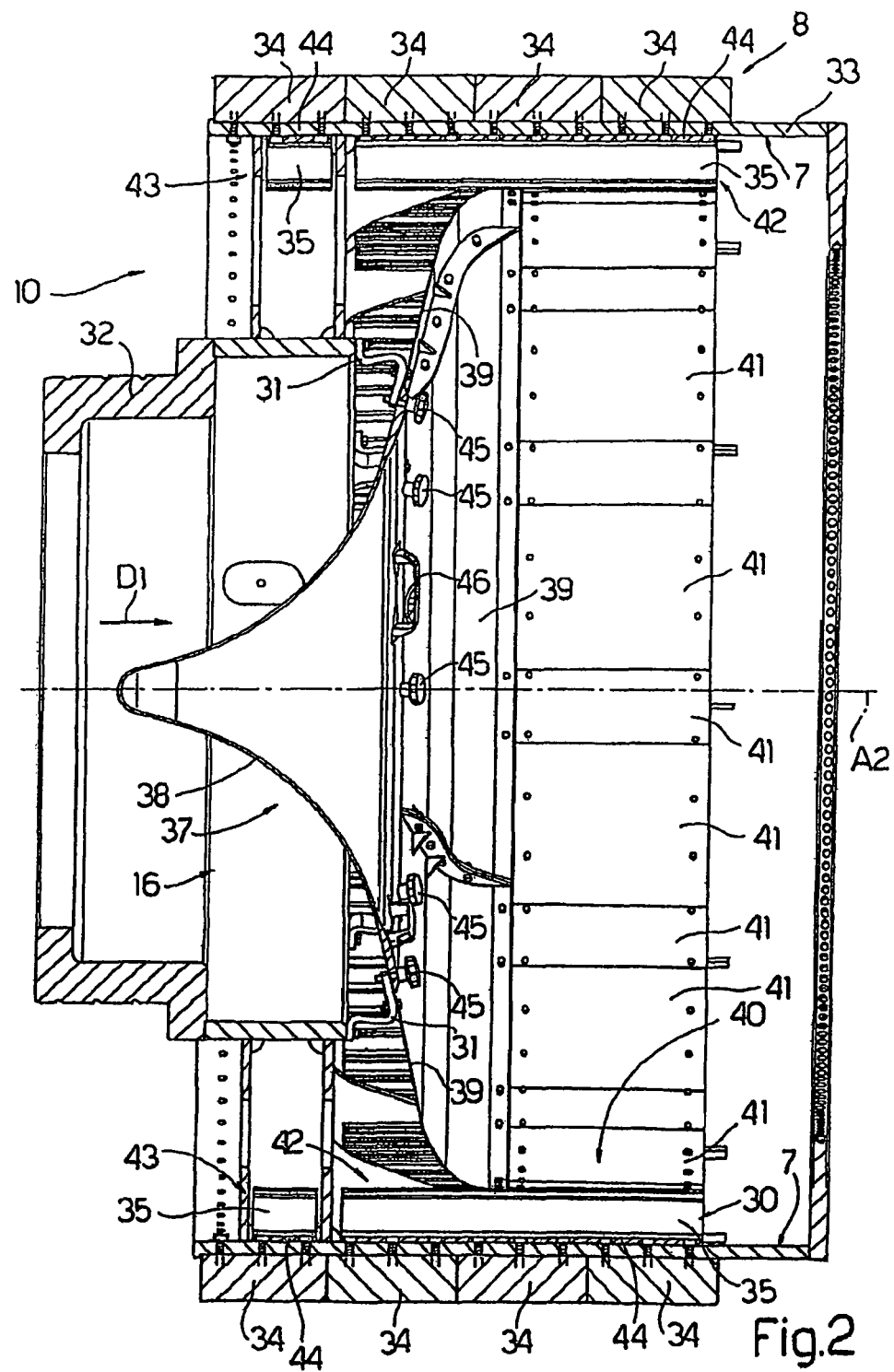
FIG. 2 shows a larger-scale lateral section of a detail of the FIG. 1 wind power generator.

As shown more clearly in FIG. 2, deflector body 16 is fixed or connected to electric machine 6, in particular to rotor 8, by means of brackets 31.

In the example shown in the drawings, and particularly in FIG. 1, rotor 8 comprises a sleeve 32 supported by bearing 13 and integral with hub 4; a cylindrical structure 33 integral with sleeve 32; and permanent magnets 34 fixed along the outer surface of cylindrical structure 33. Cylindrical structure 33 defines inner surface 7, which is a cylindrical surface.

Cooling system 10 also comprises fins 35 parallel to direction D1 and fixed or connected to inner surface 7 of cylindrical structure 33.

Stator 9 comprises a stator pack 36 fixed or connected to the surface of nacelle 3; and stator windings (not shown in the drawings).

With reference to FIG. 2, deflector body 16 is substantially axially symmetrical about axis of rotation A2, is fixed or connected to sleeve 32 by brackets 31, and comprises a substantially conical central portion 37 for guiding the airflow to inner surface 7 and defined by a central panel 38 and by a number of panels 39 extending about central panel 38; and a cylindrical portion 40 facing and parallel to inner surface 7, and which serves to define gap 30 and comprises a number of panels 41. Panels 38, 39 and 41 are connected removably to one another.

Figure 3:
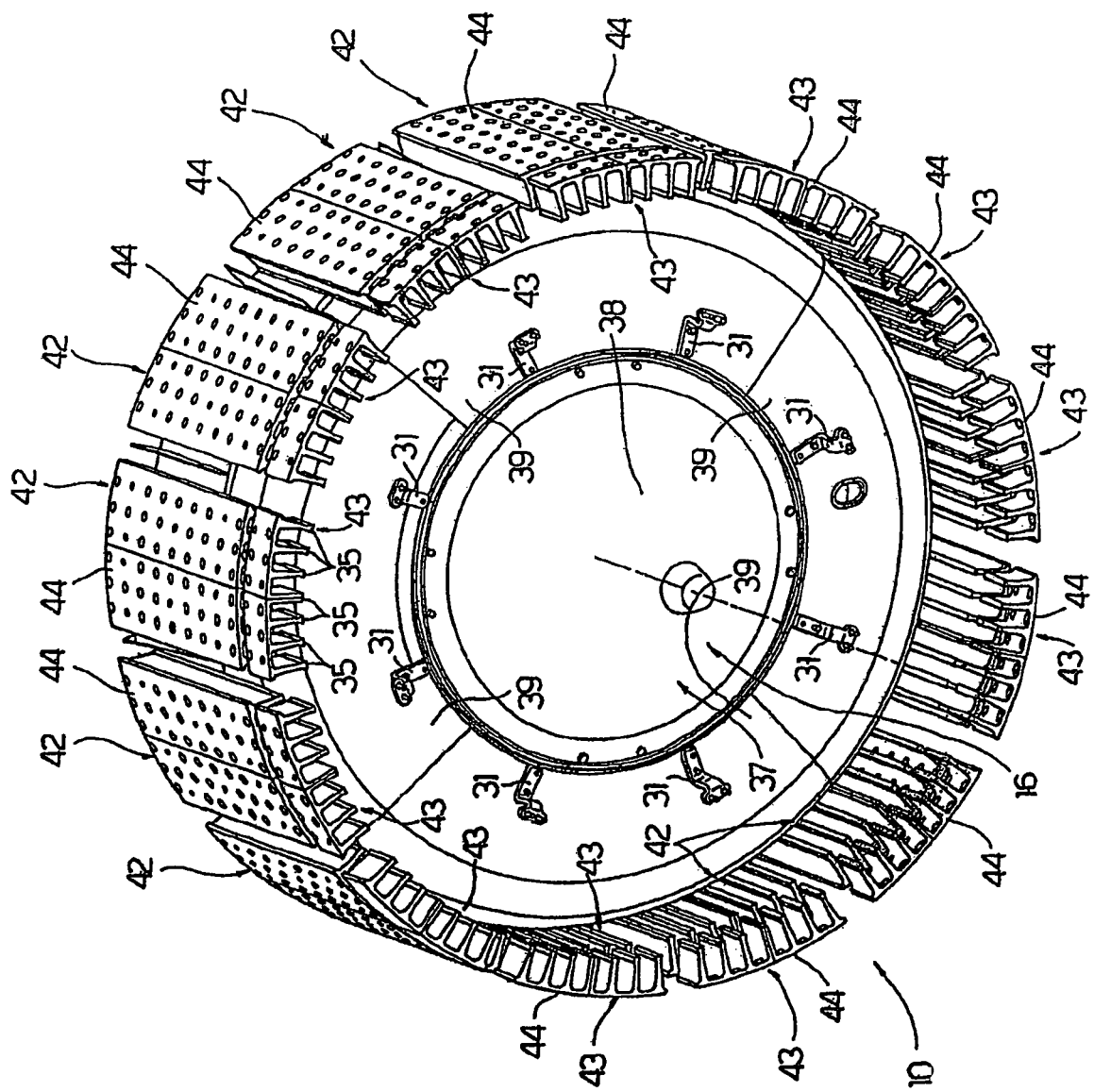
FIG. 3 shows a larger-scale view in perspective, with parts removed for clarity, of a detail of the FIG. 1 wind power generator.

With reference to FIG. 3, fins 35 extend from inner surface 7 of rotor 8 towards axis of rotation A2, and are divided into groups 42 and 43, each of which, in addition to a given number of fins 35, comprises a perforated cylindrical sector 44 fixed by screws to cylindrical structure 33. As shown in FIG. 3, fins 35 and respective cylindrical sector 44 are preferably formed in one piece.

With reference to FIG. 2, panel 38 is fixed or connected to panels 39 by means of thumbscrews 45, and comprises grips 46 by which to remove panel 38 easily to allow access by maintenance personnel inside hub 4.

With reference to FIG. 1, fan 26 is movable along axis of rotation A2 to allow passage by maintenance personnel and also to set the fan to the best operating position.

Cooling system 10 also extends partly outside nacelle 3, and comprises fins 47 parallel to axis of rotation A2 and fixed or connected to the outer surface of nacelle 3, at stator 9, to assist cooling stator 9.

In actual use, nacelle 3 is oriented about axis A1 so that axis of rotation A2 is positioned in the wind direction, with blades 5 into the wind, and the airflow therefore flows naturally along the labyrinth path into inlet 11, through hub 4 and nacelle 3, and out through outlet 12. At the same time, part of the air flows over the outer surface of nacelle 3 and onto fins 47, which increase the air-stator 9 heat exchange surface.

Airflow inside hub 4 and nacelle 3 is also assisted by fan 26, which serves to overcome any load losses in the airflow, and increases airflow speed inside hub 4 and nacelle 3.

The airflow is diverted by deflector body 16, and assumes first a predominantly radial and then a purely axial speed component, both with reference to axis of rotation A2. That is, portion 37 serves to guide the airflow to inner surface 7 of electric machine 6, and portion 40 of deflector body 16 to guide and keep the airflow close to inner surface 7 of electric machine 6 and fins 35, so the entire airflow inside nacelle 3 contacts the hottest parts of electric machine 6.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wind power generator comprising:
a nacelle;
a hub rotatable about an axis of rotation with respect to the nacelle;
at least two blades connected to the hub;
a hollow electric machine connected to the nacelle and located inside the nacelle, the hollow electric machine bounded by an inner surface extending about the axis of rotation and having a rotor and a stator; and
a cooling system configured to direct airflow from an inlet in the hub to an outlet in the nacelle to cool the hollow electric machine, the cooling system including a deflector body at least partly housed in the hollow electric machine and including a substantially conical central portion configured to guide the airflow to the inner surface of the hollow electric machine, and an end portion which defines a gap between the deflector body and the inner surface of the hollow electric machine, the substantially conical central portion configured to guide the airflow into the gap.

2. The wind power generator of claim 1, wherein the deflector body is connected to the hollow electric machine.

3. The wind power generator of claim 1, wherein the stator extends about the rotor and the deflector body is connected to the rotor.

4. The wind power generator of claim 1, wherein the deflector body includes a number of panels assembled to one another, at least one of said panels configured to be removed.

5. The wind power generator of claim 1, wherein the cooling system includes a plurality of cooling fins connected to the hollow electric machine along the inner surface.

6. The wind power generator of claim 5, wherein each fin extends parallel to the axis of rotation and towards the axis of rotation.

7. The wind power generator of claim 5, wherein the fins are divided into a plurality of groups of fins, each group of fins including a respective cylindrical sector connected to the hollow electric machine along the inner surface.

8. The wind power generator of claim 1, wherein the cooling system includes a ventilation unit configured to conduct the airflow from the hub to the nacelle.

9. The wind power generator of claim 8, wherein the ventilation unit is housed in the hub.

10. The wind power generator of claim 8, wherein the ventilation unit includes a fan movable between a work position and a rest position and configured to enable passage into the hub.

11. The wind power generator of claim 8, wherein the ventilation unit includes a fan, a guide, and a slide, the fan is connected to the slide, which is movable selectively along the guide.

12. The wind power generator of claim 1, wherein the cooling system includes a filtration device located in front of the inlet, said filtration device configured to prevent unwanted material from entering the hub.

13. The wind power generator of claim 12, wherein the filtration device includes a plurality of guide panels positioned with respect to one another to define a labyrinth path for the incoming airflow.

14. The wind power generator of claim 1, wherein the cooling system includes a plurality of fins configured to cool the hollow electric machine, said fins are connected to the nacelle along the outer surface of the nacelle at the hollow electric machine.

15. The wind power generator of claim 14, wherein the stator includes a stator pack connected directly to the nacelle along the inner surface of the nacelle.

16. The wind power generator of claim 1, wherein the end portion includes a cylindrical portion.

* * * * *